US008482149B2

(12) United States Patent
Uphues et al.

(10) Patent No.: US 8,482,149 B2
(45) Date of Patent: Jul. 9, 2013

(54) WIND POWER PLANT WITH IMPROVED COOLING AIR CONDUCTION

(75) Inventors: Ulrich Uphues, Rheine (DE); Markus Becker, Münster (DE)

(73) Assignee: Kenersys GmbH, Munster (DE)

( * ) Notice: Subject to any disclaimer, the term of this patent is extended or adjusted under 35 U.S.C. 154(b) by 235 days.

(21) Appl. No.: 12/988,169

(22) PCT Filed: Apr. 14, 2009

(86) PCT No.: PCT/EP2009/054375
§ 371 (c)(1),
(2), (4) Date: Oct. 15, 2010

(87) PCT Pub. No.: WO2009/127608
PCT Pub. Date: Oct. 22, 2009

(65) Prior Publication Data
US 2011/0037270 A1  Feb. 17, 2011

(30) Foreign Application Priority Data
Apr. 16, 2008  (DE) .......................... 10 2008 019 271

(51) Int. Cl.
  *F03D 9/00*  (2006.01)
(52) U.S. Cl.
  USPC ........................................................ 290/55
(58) Field of Classification Search
  USPC ... 49/51, 95; 52/205, 206, 215–217; 454/195, 454/283, 88
  See application file for complete search history.

(56) References Cited

U.S. PATENT DOCUMENTS

| | | | |
|---|---|---|---|
| 3,159,093 A * | 12/1964 | Rosenfeld Morton | 49/401 |
| 6,676,122 B1 | 1/2004 | Wobben | 270/55 |
| 6,774,504 B1 * | 8/2004 | Lagerwey | 290/44 |
| 7,270,600 B2 * | 9/2007 | Kim et al. | 454/198 |
| 7,775,773 B2 | 8/2010 | Wernicke | 416/244 |
| 7,795,745 B2 * | 9/2010 | Mellon et al. | 290/1 A |
| 8,227,932 B2 * | 7/2012 | Murata et al. | 290/55 |
| 2007/0296220 A1 * | 12/2007 | Kristensen | 290/55 |
| 2009/0046423 A1 * | 2/2009 | Hom et al. | 361/694 |
| 2010/0308596 A1 * | 12/2010 | Gawrisch et al. | 290/55 |

FOREIGN PATENT DOCUMENTS

| | | |
|---|---|---|
| DE | 3504840 A1 * | 8/1986 |
| DE | 37 85 188 | 1/1994 |
| DE | 200 13 756 | 12/2000 |
| DE | 199 47 915 | 4/2001 |
| DE | 100 00 370 | 7/2001 |
| DE | 202 05 015 | 8/2002 |
| DE | 20 2006 003628 | 6/2006 |
| DE | 10 2004 061391 | 7/2006 |
| DE | 10 2006 043936 | 3/2008 |

(Continued)

*Primary Examiner* — Tulsidas C Patel
*Assistant Examiner* — Sean Gugger
(74) *Attorney, Agent, or Firm* — Roberts & Roberts, LLP

(57) ABSTRACT

What is disclosed is a wind turbine comprising a tower with a closable climbing opening and electrical components disposed inside the tower. In order to provide said wind turbine with the ability to provide a cooling system for cooling the electrical components, in particular the electrical components disposed in the area near the base of the tower, said cooling system able to be cost-effectively installed, it is proposed that the door opening of the wind turbine be located in a continuous tower port which is larger than the door opening, with air intake and exhaust openings passing through said tower port for passage of cooling air.

8 Claims, 2 Drawing Sheets

FOREIGN PATENT DOCUMENTS

| | | |
|---|---|---|
| WO | WO 8802805 | 4/1988 |
| WO | WO 99/030031 | 6/1999 |
| WO | WO 03/036085 | 5/2003 |
| WO | WO 2007/110718 | 10/2007 |
| WO | WO 2009/094991 | 8/2009 |

* cited by examiner

WIND POWER PLANT WITH IMPROVED COOLING AIR CONDUCTION

FIELD OF THE INVENTION

The invention relates to a wind power plant, having a tower that has a closable access opening, and electrical components disposed inside the tower.

PRIOR ART

Wind power plants in the most various forms have long been known and by now are widely used. The proportion of energy generated with wind power plants has risen constantly not only in Germany but in other countries as well; by now, both land-based and offshore wind power plants have been set up and installed in great numbers.

In wind power plants, as in nearly all power plants, energy conversion produces waste heat, which must be dissipated from the plant by suitable provision.

Such waste heat occurs not only in the vicinity of the generator, typically disposed at the top of the tower in a machine housing (gondola), but at other electrical components as well, which are used for converting the electrical energy obtained in terms of its frequency and voltage. These last-named components, in modern wind power plants, are often disposed in the vicinity of the tower base and usually stand on the foundation, either directly or stacked on one another. These components must also be cooled.

To attain the cooling not only of these components but also of the generator, various solutions to this problem are known. For instance, in International Patent Disclosure WO 99/30031, a wind power plant is disclosed in which cooling air for cooling the generator is let into the tower in the vicinity of its base, through openings not further specified, and in the tower, this cooling air is first heated in the vicinity of the base by the waste heat of electrical components disposed there and then, by a chimney effect, rises upward in the tower and sweeps past the generator for cooling it and finally leaves the wind power plant there.

A further system for cooling the wind power plant, especially the electrical components, is described in German Patent Disclosure 100 00 370 A1. In this reference, a closed cooling circuit is disclosed in which a cooling medium (air) is circulated upward along the tower, through the generator there, and then moved back in the direction of the tower base.

In German Patent Disclosure 10 2004 061391 A1, finally, an air cooling system is described which explicitly serves to cool the electrical components disposed in the vicinity of the tower base. Here, air is aspirated through an air conduit, which conducted through the foundation of the tower and ends with an opening next to the wind power plant, in the vicinity of the subsoil, and the air is conducted past the electrical components that are to be cooled. The thus-aspirated air is then conducted back out of the wind power plant again via a venting segment, through an opening in the tower wall provided particularly for this.

The known wind power plants and the cooling systems contained in them do as a rule reliably meet the purpose of adequate cooling of the components to be cooled; however, they are costly to set up, they thus make the wind power plant more expensive, and they require both additional equipment and layouts for the wind power plant that involve more effort and complexity.

For instance, a closed cooling circuit, of the kind disclosed in DE 100 00 370 A1, requires the setup of corresponding cooling conduits over the entire height of the wind power plant, which requires corresponding engineering effort and increased production costs.

In a cooling system in accordance with DE 10 2004 061391 A1, which essentially serves solely to cool the electrical components disposed in the vicinity of the tower base, planning and production are both complicated. Not only must corresponding conduction lines be laid through the foundation of the tower into the interior of the tower, but a separate opening must also be provided in the tower wall for the venting segment. At present, the towers of wind power plants are typically erected on-site from prefabricated segments; the segments may be of metal and/or plastic (glass fiber reinforced plastic). The goal in this respect is to keep the wall thickness of the segments as slight as possible, yet without sacrifices in terms of stability. This effort is due not only to the requirement for economy in terms of low consumption of material but also to considerations with regard to the weight of the individual segments, which must not exceed critical values for transportation to the building site. To this extent, the weight of a tower segment can be a limit for the size of such a segment; fundamentally, for the sake of fast, economical construction of the wind power plant, larger segments are advantageous.

For static reasons, the making of each opening or aperture in the sheathing of the tower or tower segment causes weakening, which must be managed with engineering effort, for instance by reinforcing the segment wall in the vicinity of the aperture. In that sense, providing corresponding openings in the tower wall or in a segment is expensive, not merely because of the requisite processing time and material consumption.

Based on the same considerations, the system disclosed in WO 99/30031 is also in need of improvement; it is clearly apparent that in it, cooling air flows through a plurality of openings formed in the vicinity of the base of the tower. Here as well, accordingly, multiple openings must be made in the tower wall, with the unwanted consequences described above.

SUMMARY OF THE INVENTION

The object of the invention takes its point of departure here. Specifically, with the invention, the object to be attained is to disclose a wind power plant having a cooling system for cooling electrical components, particularly the electrical components disposed in the vicinity of the base of the tower, which cooling system can be set up economically.

This object is attained by a wind power plant having the characteristics of claim 1. Advantageous refinements are recited in dependent claims 2 through 7.

The recognition or concept that is essential to the invention is for an open cooling system with air cooling with air inlet and outlet openings which should not be accommodated in special openings in the tower created for them; but instead, the opening in the tower, which is present anyway for the door, should be used for providing air inlet and/or outlet openings, and this door opening should be widened accordingly. In other words, a wind power plant is disclosed that can make do with a single tower port which is enlarged compared to a conventional door opening, and the door opening on the one hand and the air through openings on the other, through which cooling air can enter and leave, are disposed in this tower port.

It has in fact been surprisingly demonstrated that with this seemingly simple provision of enlarging the door opening, which is to be made conventionally anyway, to make an enlarged tower port, the stability of the tower or tower segment in this vicinity is hardly reduced, or is not reduced excessively, so that compared to the engineering effort and material expense involved anyway in providing the door opening, no substantial or considerable additional efforts and expense for strengthening the tower in this vicinity, although they are necessary when further, separate openings for carrying air through are provided, are required.

As a result, air inlet and/or outlet openings can be provided especially economically and without considerable static weakening of the tower.

Because of the given structural properties of the tower, it is advantageous to expand the door opening not in width, in which any further expansion would mean considerable weakening of the tower, but rather in height. Accordingly, it is therefore preferable if in accordance with claim 2, the tower port is extended upward relative to the door opening, and at least one air outlet or inlet opening is disposed or guided above the door opening.

Based on similar considerations, alternatively or in addition the tower port can also be lengthened downward relative to the door opening, and here as well, at least one air through opening is disposed or conducted.

In addition or in particular as an alternative to the disposition of air inlet openings in the vicinity below or above the door opening, air inlet openings can also exist by means of suitable slots in a door that closes the door opening. This version, as long as the cross-sectional area of the air inlet slots is sufficient for adequate supply of cooling air, offers the advantage that the tower port overall can be kept even smaller in area, and thus the static impairment of the tower remains especially slight.

The solution according to the invention to the problem of conducting the cooling air with air inlet and/or outlet opening in the vicinity of an enlarged tower port with a door opening integrated in it is especially well suited for cooling the electrical components disposed in the vicinity of the door opening and in particular located in the vicinity of the tower base, such as power converters and the like. Specifically, cooler outside air can be aspirated through an air inlet opening and made to sweep past the components that are to be cooled and can then be blown out again directly through an air outlet opening.

To prevent unauthorized persons or animals or objects from reaching the interior of the wind power plant through the air inlet and/or outlet opening, the corresponding openings are advantageously closed by suitable devices, in particular for instance gratings, lamellar curtains, or the like.

The air flow of cooling air at the entry through the air inlet openings past the components to be cooled and finally at the exit through the air outlet openings can be put into operation and maintained in particular with the aid of a separate are delivery means, for instance with a fan. A single fan may be provided, which provides for all the circulation, or a plurality of fans may be provided, for instance one for aspirating the cooling air and a further one for blowing the heated air out through the air outlet opening(s).

BRIEF DESCRIPTION OF THE DRAWINGS

Further advantages and characteristics of the solution according to the invention will become apparent from the ensuing description of an exemplary embodiment in conjunction with the accompanying drawing. In the drawing.

WAY(S) FOR EMBODYING THE INVENTION

Figure 1:
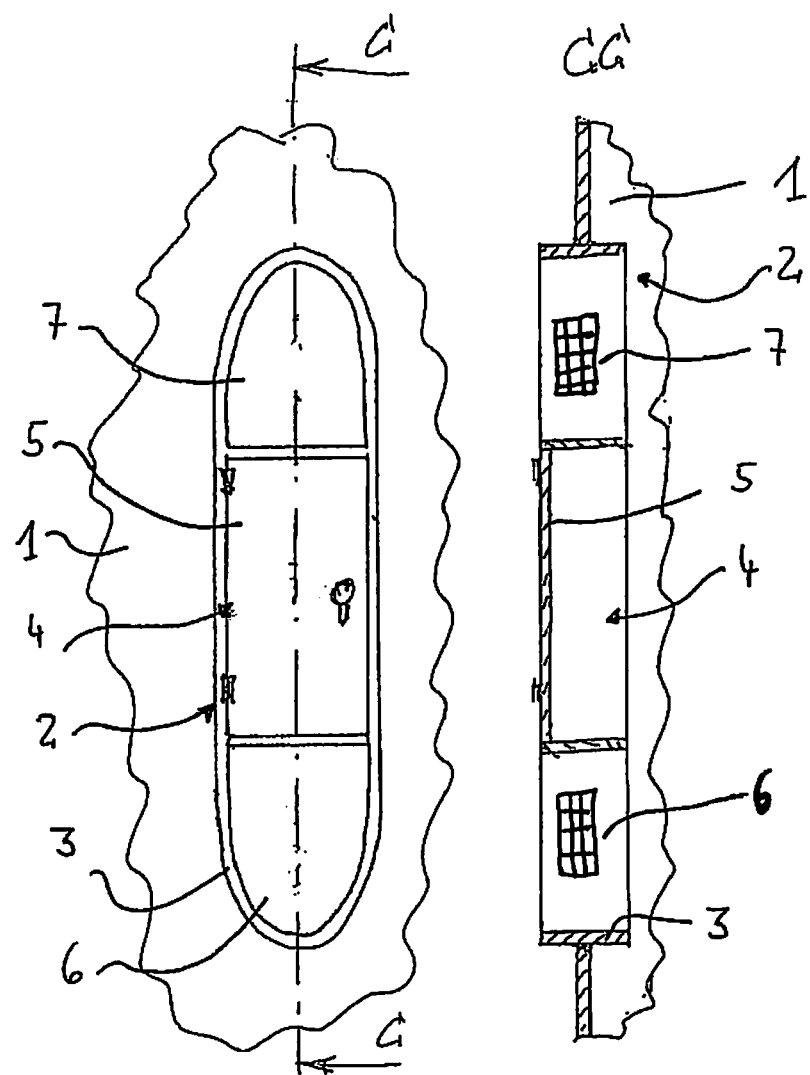
FIG. 1, both in a top view and in a sectional side view, shows a detail of a tower of a wind power plant according to the invention, with a tower port designed in accordance with the invention, in one exemplary embodiment.
Figure 2:
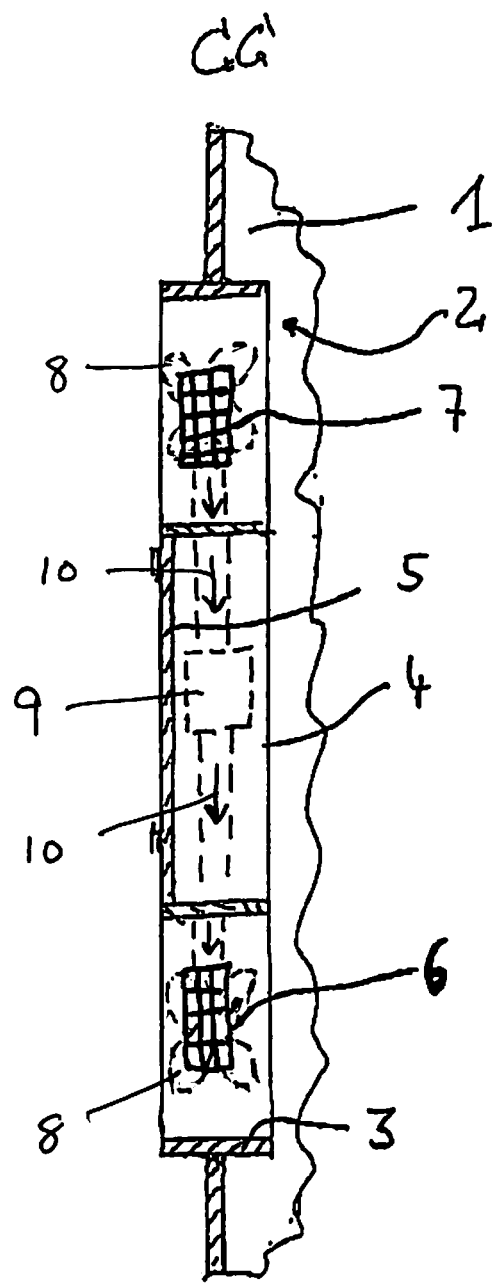
FIG. 2 provides a sectional side view showing internal and external details of a wind power plant according to the invention, including the internal delivery means, electrical componenet, and flow of air.

In FIG. 1, in a detail, the tower 1 of a wind power plant not shown in further detail is shown, in particular a lowermost segment located at the base of the tower. The tower 1, in the portion shown in FIG. 1, has a tower port 2, which is continuous in design. The tower port 2 is surrounded all the way around by a reinforcing frame 3, which ensures the stability at this point of the tower sheathing, which stability is in principle impaired by the tower port 2.

The tower port 2 is located on the tower 1 of the wind power plant at a point that is usual for the door opening but is enlarged compared to a conventional cutout for the door opening. Thus in the exemplary embodiment of the invention as well, the tower port 2 contains the door opening 4, in which a door 5 closing this opening is disposed in the usual way. Past the door opening 4 both upward and downward, the tower port 2 is embodied in lengthened form, compared to conventional door openings in known wind power plants, with an air inlet opening 6 located below the door opening 4 and an air outlet opening 7 located above the door opening 4. These air through openings, that is, the air inlet opening 6 and the air outlet opening 7, are shown schematically in the exemplary embodiment; for example, they can be subdivided by means of air conduction pipes or the like. In particular, the air through openings 6, 7, in practical use, will be covered, for instance by a grating, to prevent persons, animals, or foreign bodies from getting in. In the circumferential direction of the tower 1, the tower port 2 is enlarged only insubstantially if at all compared to a conventional door opening of known wind power plants.

In the vicinity behind the tower port 2 in the interior of the tower 1, there are electrical components (not shown here) that have to be cooled and are in a single-story or multi-story arrangement. These components are cooled by means of air flowing through the air through openings 6, 7. By means of fans or similar are delivery means, for instance, cool outside air is aspirated through the air inlet opening 6 into the interior of the tower 1. This air then sweeps past the electrical components to be cooled and is forced or blown out again through the air outlet opening 7, for instance by means of a further fan.

It will be clear that disposing air inlet and outlet openings in a tower port that has the door opening makes considerably simpler construction and tower design in this area possible, compared to designs that provide additional, separate through openings for conducting cooling air next to the door opening.

LIST OF REFERENCE NUMERALS

1 Tower
2 Tower port
3 Frame
4 Door opening
5 Door
6 Air inlet opening
7 Air outlet opening
8 Delivery means
9 Electrical component
10 Flow of air

The invention claimed is:
1. A wind power plant, comprising a tower that has a closable access opening and having electrical components disposed inside the tower, wherein a door opening is disposed in a continuous tower port which is larger than the door opening and through which tower port air inlet openings and/or outlet openings for conducting cooling air are laid, wherein the tower port extends upward relative to the door opening and comprises at least one air inlet opening or outlet opening disposed above the door opening, wherein the tower port extends downward relative to the door opening and comprises at least one air inlet opening or outlet opening disposed below the door opening, and wherein air flowing through the at least one air inlet opening or outlet opening disposed above the door opening flows in an opposite direction of air flowing through the at least one air inlet opening or outlet opening disposed below the door opening.

2. The wind power plant as defined by claim 1 wherein a door, which closes the door opening, is provided with air through openings, which act as air inlet openings.

3. The wind power plant as defined by claim 1 wherein the electrical components to be cooled through the air through opening are disposed essentially in the vicinity of the tower port inside the tower.

4. The wind power plant as defined by claim 1 wherein the air inlet openings and/or the air outlet openings are secured against the entry of persons, animals, and/or objects by a grating or movable plates.

5. The wind power plant as defined by claim 1 wherein at least one delivery means is provided for aspirating air through the air inlet opening or blowing air out through the air outlet opening.

6. The wind power plant as defined by claim 2 wherein the air inlet openings and/or the air outlet openings are secured against the entry of persons, animals, and/or objects by a grating or movable plates.

7. The wind power plant as defined by claim 3 wherein the air inlet openings and/or the air outlet openings are secured against the entry of persons, animals, and/or objects by a grating or movable plates.

8. The wind power plant as defined by claim 5 wherein the air inlet openings and/or the air outlet openings are secured against the entry of persons, animals, and/or objects by a grating or movable plates.

\* \* \* \* \*